US012607144B2

(12) United States Patent
Fountain et al.

(10) Patent No.: US 12,607,144 B2
(45) Date of Patent: Apr. 21, 2026

(54) INTERNAL COMBUSTION ENGINE HAVING COMMON ENGINE PARTS AND METHOD OF FORMING SAME

(71) Applicant: ASF Technologies ( Australia ) Pty Ltd, Sydney (AU)

(72) Inventors: Graham Harry Fountain, Sydney (AU); Emmanuel Kavarnos, Sydney (AU); Dimitrios Psonis, Sydney (AU); Richard Terrence Tamba, Sydney (AU)

(73) Assignee: ASF Technologies (Australia) Pty Ltd, Sydney (AU)

( * ) Notice: Subject to any disclaimer, the term of this patent is extended or adjusted under 35 U.S.C. 154(b) by 0 days.

(21) Appl. No.: 18/266,369

(22) PCT Filed: Dec. 6, 2021

(86) PCT No.: PCT/AU2021/051455

§ 371 (c)(1),
(2) Date: Jun. 9, 2023

(87) PCT Pub. No.: WO2022/120414

PCT Pub. Date: Jun. 16, 2022

(65) Prior Publication Data

US 2024/0044286 A1 Feb. 8, 2024

(30) Foreign Application Priority Data

Dec. 9, 2020 (AU) ................................ 2020904567

(51) Int. Cl.
*F02B 75/24* (2006.01)
*F02F 1/24* (2006.01)
*F02F 7/00* (2006.01)

(52) U.S. Cl.
CPC .............. *F02B 75/243* (2013.01); *F02F 1/24* (2013.01); *F02F 7/0009* (2013.01); *F02F 7/0021* (2013.01); *F02F 7/0046* (2013.01); *F02F 2200/06* (2013.01)

(58) Field of Classification Search
CPC ......... F02B 75/243; F02F 1/24; F02F 7/0009; F02F 7/0021; F02F 7/0046; F02F 2200/06
See application file for complete search history.

(56) References Cited

U.S. PATENT DOCUMENTS 1,304,744 A * 5/1919 Dickerson ................. F01L 5/04 123/190.6
1,991,094 A * 2/1935 Higley ...................... H02P 9/06 475/152

(Continued)

FOREIGN PATENT DOCUMENTS

JP H0313448 U 2/1991

OTHER PUBLICATIONS

Jan. 3, 20221—(WO) International Search Report and Written Opinion—PCT/AU2021/051455.

*Primary Examiner* — Kurt Philip Liethen
(74) *Attorney, Agent, or Firm* — Banner & Witcoff, Ltd.

(57) ABSTRACT

An internal combustion engine, including a piston, a cylinder, and an output shaft, wherein the piston is arranged for reciprocating motion within the cylinder, driven by combustion, and the piston is coupled to the output shaft by a coupling such that said reciprocating motion of the piston drives rotation of the output shaft, wherein the engine has increased engine part commonality. The internal combustion engine may include a first cylinder bank and a second cylinder bank, the first cylinder bank having a first cylinder head, the second cylinder bank having a second cylinder head, and the first cylinder head and the second cylinder head being formed as common parts such that they are interchangeable. An internal combustion engine, including a piston, a cylinder, and an output shaft, wherein the piston is arranged for reciprocating motion within the cylinder, driven (Continued)

by combustion, and the piston is coupled to the output shaft by a coupling such that said reciprocating motion of the piston drives rotation of the output shaft, wherein the engine includes a crankcase formed of a plurality of separable like parts, each of the like parts being cast as a common part.

18 Claims, 16 Drawing Sheets

(56) References Cited

U.S. PATENT DOCUMENTS

| | | | | | |
|---|---|---|---|---|---|
| 2,147,290 | A | * | 2/1939 | Gardner | F01C 1/07<br>192/48.91 |
| 2,290,202 | A | | 7/1942 | Nelson | |
| 2,713,852 | A | | 7/1955 | Trout | |
| 2,764,143 | A | | 9/1956 | Wiseman | |
| 3,561,416 | A | | 2/1971 | Kiekhaefer | |
| 3,673,990 | A | | 7/1972 | Alfieri | |
| 3,738,338 | A | * | 6/1973 | Wickman | F02B 61/02<br>123/90.27 |
| 4,129,103 | A | | 12/1978 | Pichl | |
| 4,399,777 | A | * | 8/1983 | Hoettels | F02F 7/0012<br>123/DIG. 6 |
| 4,546,865 | A | * | 10/1985 | Hodgman | F16D 47/02<br>192/115 |
| 5,385,125 | A | * | 1/1995 | Oyaizu | F01L 1/026<br>123/90.31 |
| 2019/0338679 | A1 | * | 11/2019 | Kano | F01M 1/02 |
| 2022/0403876 | A1 | * | 12/2022 | Fountain | F16C 33/1025 |

* cited by examiner

INTERNAL COMBUSTION ENGINE HAVING COMMON ENGINE PARTS AND METHOD OF FORMING SAME

CROSS-REFERENCE TO RELATED APPLICATIONS

This application is a U.S. National Stage application under 35 U.S.C. § 371 of International Application PCT/AU2021/051455, filed Dec. 6, 2021, which claims the benefit of priority to Application AU 2020904567, filed Dec. 9, 2020. Benefit of the filing date of each of these prior applications are hereby claimed. Each of these prior applications are hereby incorporated by reference in their entirety.

FIELD OF THE INVENTION

This invention relates to an internal combustion engine. More particularly, but not exclusively, the invention relates to an internal combustion engine, for example with multiple banks of cylinders, with improved cost-effectiveness through the use of common engine parts.

BACKGROUND OF THE INVENTION

It is known to provide an internal combustion engine for powering items such as a vehicle, generator, machinery or the like. Traditional conventional internal combustion engines use a crankshaft, crankpins and connecting rods. However the applicant has identified that there are limitations in noise, vibration, smoothness, efficiency and emissions of conventional internal combustion engines.

In many traditional engines, especially V-configured engines, opposed engines or boxer engines, the engine is made up of major components that are unique to the left or right side of the engine. For example, the cylinder head will be different on the right bank versus the left bank, and the engine block will be different on the left bank versus the right bank. These parts are not only different in their machined form but also different in their original cast form. This requires separate dies, tooling and fixtures/jigs in order to make, machine and use these parts. On top of this, the surrounding parts are also affected by the non-commonality, things like gaskets, mounting faces and accessory parts. Some manufacturers have gone to length to "commonise" some of the major part mounting faces to enable the use of more common pieces but not to the extent as proposed with the present invention.

The applicant has determined that it would be beneficial for there to be provided an internal combustion engine which overcomes or at least alleviates one or more disadvantages of existing engines, while providing an engine which is more cost-effective to produce.

Accordingly, examples of the present invention seek to avoid or at least ameliorate the disadvantages of existing internal combustion engines.

SUMMARY OF THE INVENTION

In accordance with one aspect of the present invention, there is provided an internal combustion engine, including a piston, a cylinder, and an output shaft, wherein the piston is arranged for reciprocating motion within the cylinder, driven by combustion, and the piston is coupled to the output shaft by a coupling such that said reciprocating motion of the piston drives rotation of the output shaft, wherein the engine has increased engine part commonality.

Preferably, the engine includes a first cylinder bank and a second cylinder bank, wherein the first cylinder bank has a first cylinder head, the second cylinder bank has a second cylinder head, and wherein the first cylinder head and the second cylinder head are formed as common parts such that they are interchangeable.

More preferably, the first cylinder head and the second cylinder head are formed as common castings such that they are interchangeable parts.

Preferably, the engine includes a first cylinder bank and a second cylinder bank, wherein the first cylinder bank has a first cylinder block, the second cylinder bank has a second cylinder block, and wherein the first cylinder block and the second cylinder block are formed as common parts such that they are interchangeable.

More preferably, the first cylinder block and second cylinder block are formed as common castings such that they are interchangeable parts.

Preferably, one end of the engine is provided with a first mounting part for mounting other components and an opposite end of the engine is provided with a second mounting part for mounting other components, and wherein the first mounting part and the second mounting part are formed as common parts such that they are interchangeable.

More preferably, the first mounting part and the second mounting part are arranged with a mounting face for coupling to a transmission, generator or other device.

Even more preferably, the first mounting part and the second mounting part are arranged to couple a transmission to one end of the vehicle and an electric motor or generator to the opposite end of the engine.

Preferably, the engine includes a first cylinder bank and a second cylinder bank, wherein drive for a camshaft of the first cylinder bank from the crankshaft is at one end of the crankshaft, and wherein drive for a camshaft of the second cylinder bank from the crankshaft is at an opposite end of the crankshaft.

In one form, the coupling is arranged such that the piston has sinusoidal motion for constant rotational velocity of the output shaft when plotted against rotational angle of the output shaft. More preferably, the engine is in the form of an opposed cylinder engine.

In accordance with another aspect of the present invention, there is provided an internal combustion engine, including a plurality of pistons, a plurality of cylinders, and an output shaft, wherein the pistons are arranged for reciprocating motion within the cylinders, driven by combustion, and the pistons are coupled to the output shaft by a coupling such that said reciprocating motion of the piston drives rotation of the output shaft, wherein the engine includes a first cylinder bank and a second cylinder bank, wherein drive for a camshaft of the first cylinder bank from the output shaft is at one end of the output shaft, and wherein drive for a camshaft of the second cylinder bank from the output shaft is at an opposite end of the output shaft.

In accordance with yet another aspect of the present invention, there is provided an internal combustion engine, including a piston, a cylinder, and an output shaft, wherein the piston is arranged for reciprocating motion within the cylinder, driven by combustion, and the piston is coupled to the output shaft by a coupling such that said reciprocating motion of the piston drives rotation of the output shaft, wherein the engine includes an engine cylinder block formed as separable parts, being a crankcase and at least one cylinder block.

In accordance with yet another aspect of the present invention, there is provided an internal combustion engine, including a piston, a cylinder, and an output shaft, wherein the piston is arranged for reciprocating motion within the cylinder, driven by combustion, and the piston is coupled to the output shaft by a coupling such that said reciprocating motion of the piston drives rotation of the output shaft, wherein the engine includes a crankcase formed of a plurality of separable like parts, each of the like parts being cast as a common part.

Preferably, each of the like parts is an identical part. More preferably, each of the like parts is cast from a common mould.

In a preferred form, the crankcase is formed of a pair of said separable like parts, such that each of said separable like parts is a half of the crankcase. More preferably, the engine further includes a plurality of cylinder blocks, each of the cylinder blocks being formed as a common part.

Preferably, the engine further includes a plurality of cylinder heads, each of the cylinder heads being formed as a common part.

In accordance with yet another aspect of the present invention, there is provided a method of forming an engine as described above, the method including the step of casting the crankcase halves as similar parts; machining the castings, and coupling together the crankcase halves to form the crankcase.

Preferably, the step of coupling together the crankcase halves is performed by bolting together said crankcase halves.

In a preferred form, the method further includes the step of final machining a crankshaft bore in the crankcase subsequent to the step of coupling together the crankcase halves.

BRIEF DESCRIPTION OF THE DRAWINGS

The invention is further described by way of non-limiting example only with reference to the accompanying drawings, in which.

DETAILED DESCRIPTION

Figure 1:
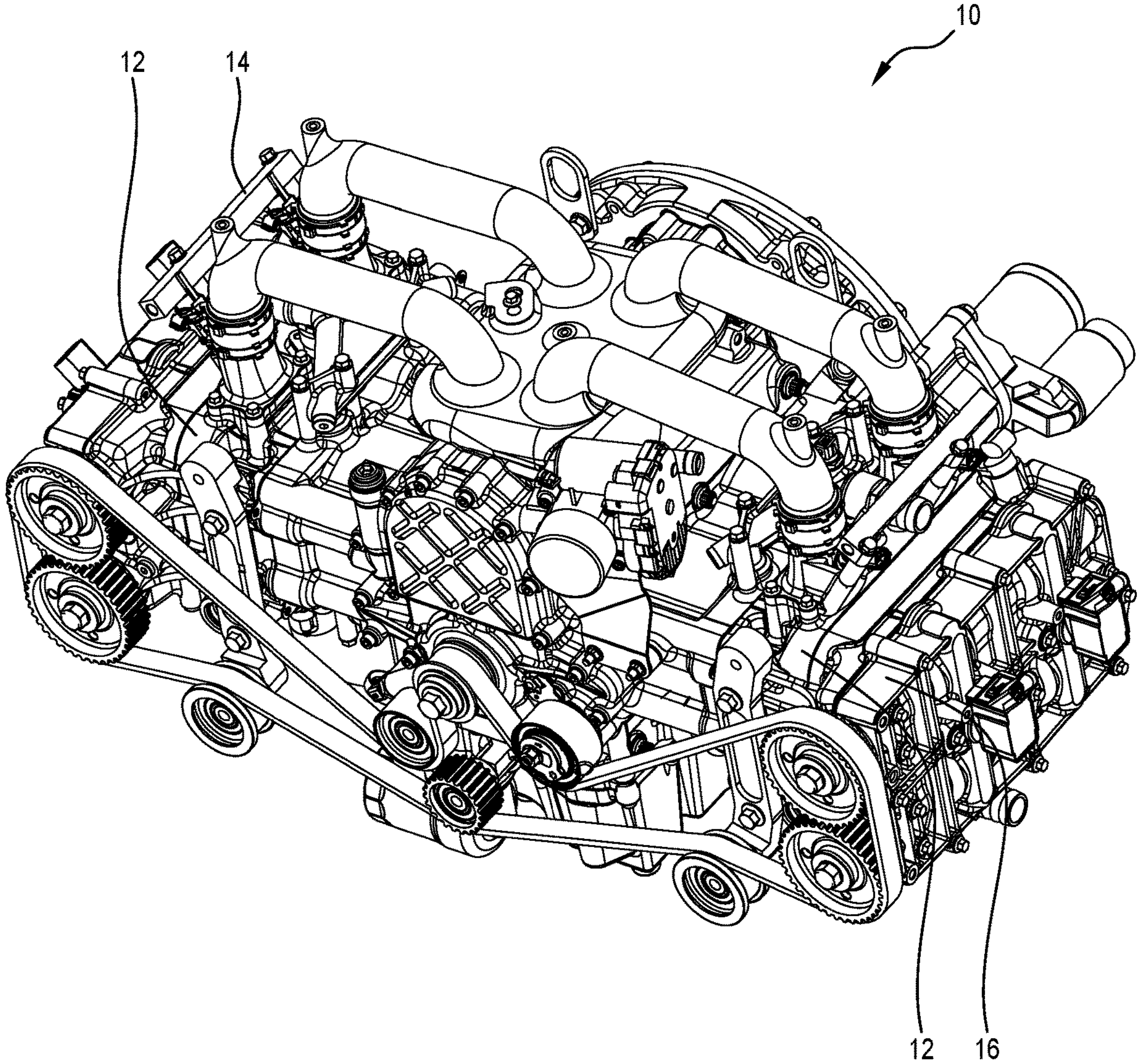
FIG. 1 shows a perspective front view of an opposed cylinder engine using different cylinder heads and block castings on each cylinder bank.
Figure 2:
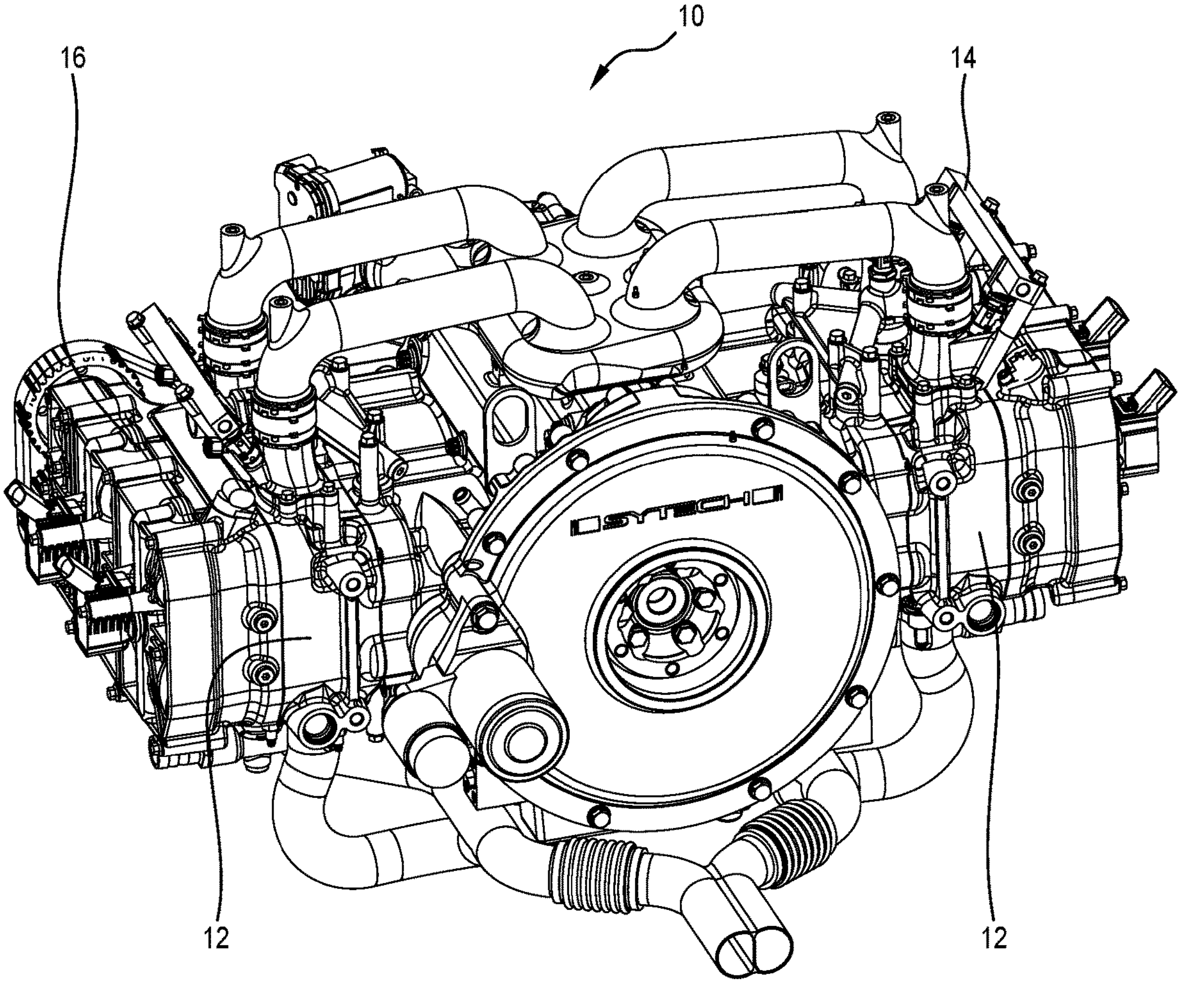
FIG. 2 shows a perspective rear view of the opposed cylinder engine shown in FIG. 1.
Figure 3:
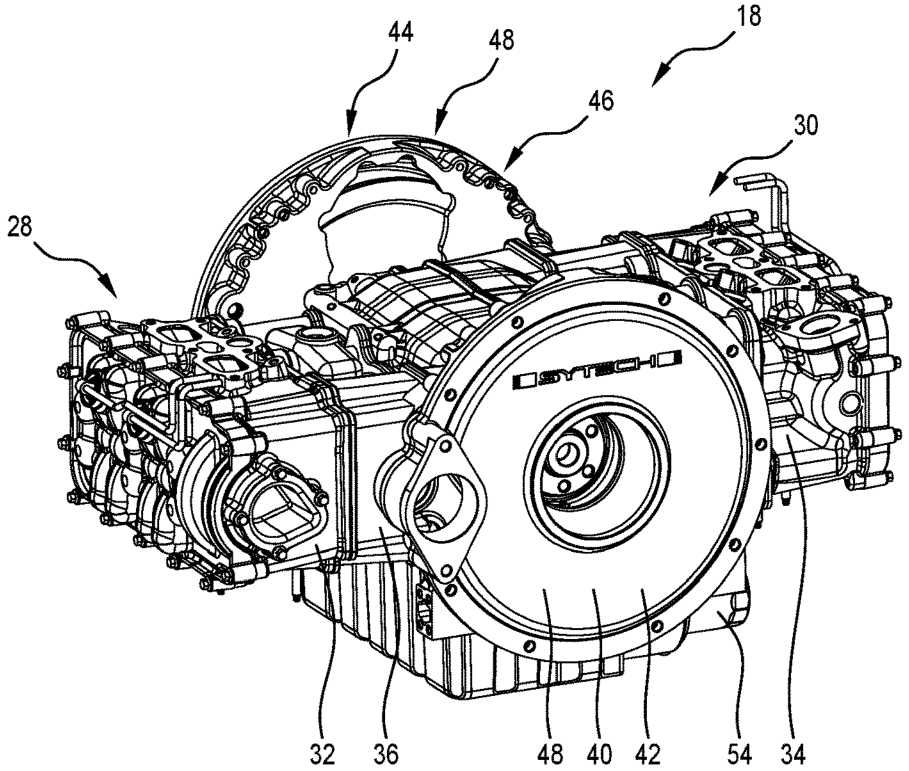
FIGS. 3 to 7 show various views of an internal combustion engine in accordance with an example of the present invention, depicting an example engine layout with virtually identical front and rear views.
Figure 4A:
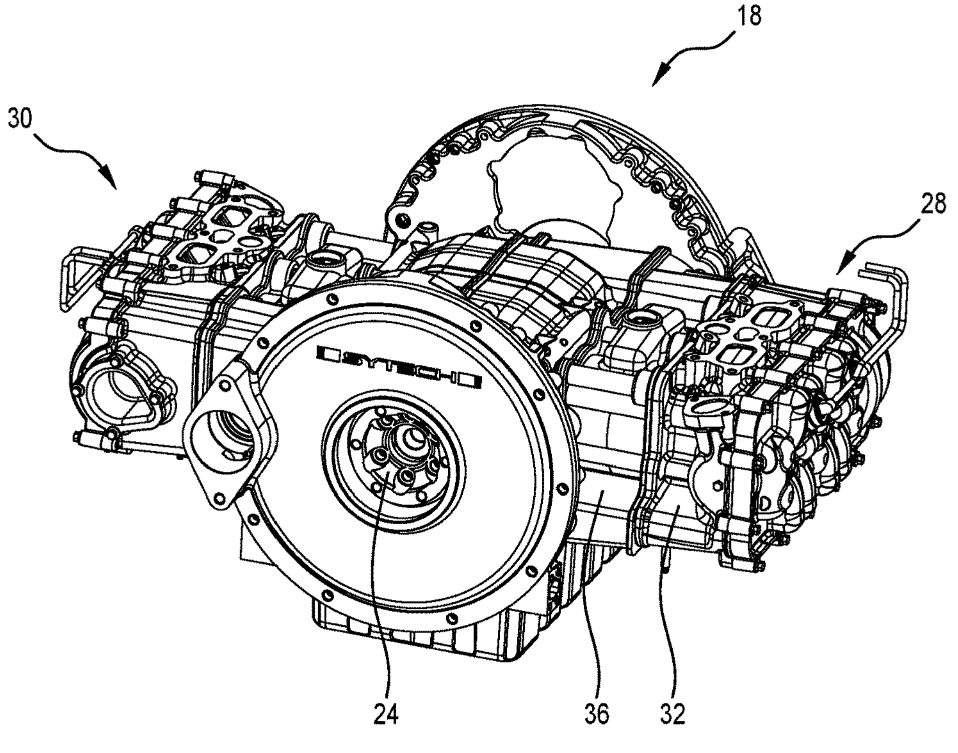
Figure 4B:
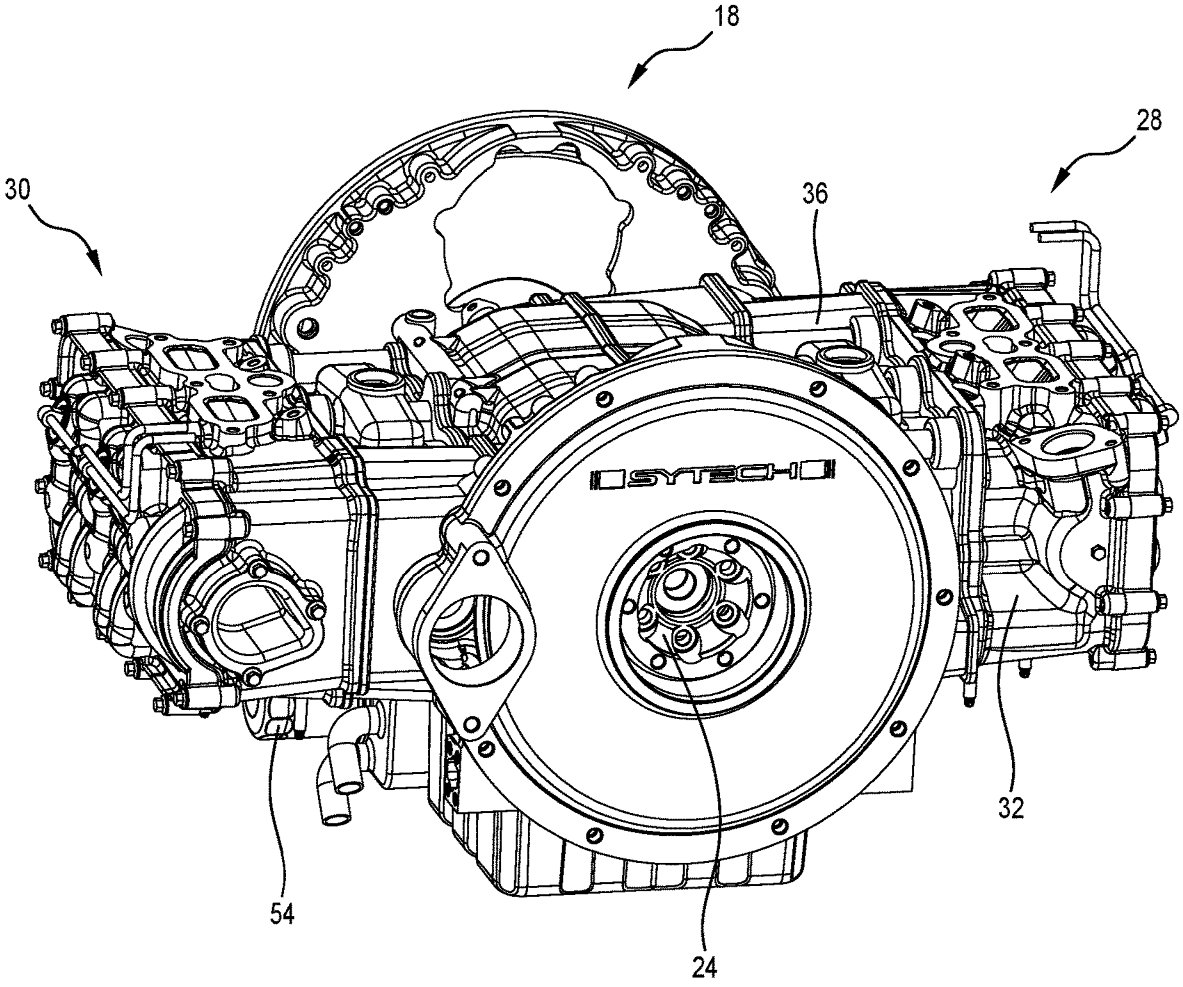
Figure 5:
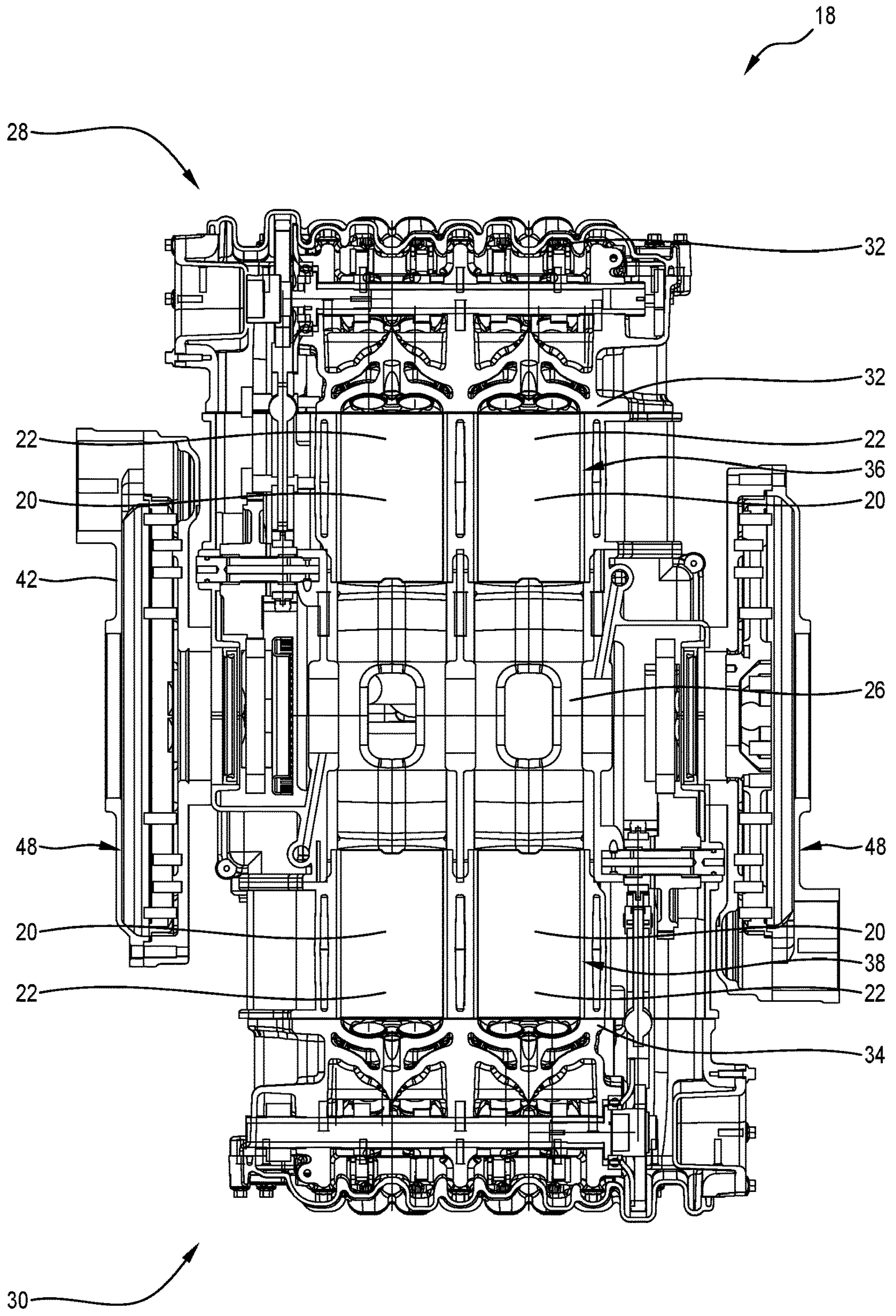
Figure 6:
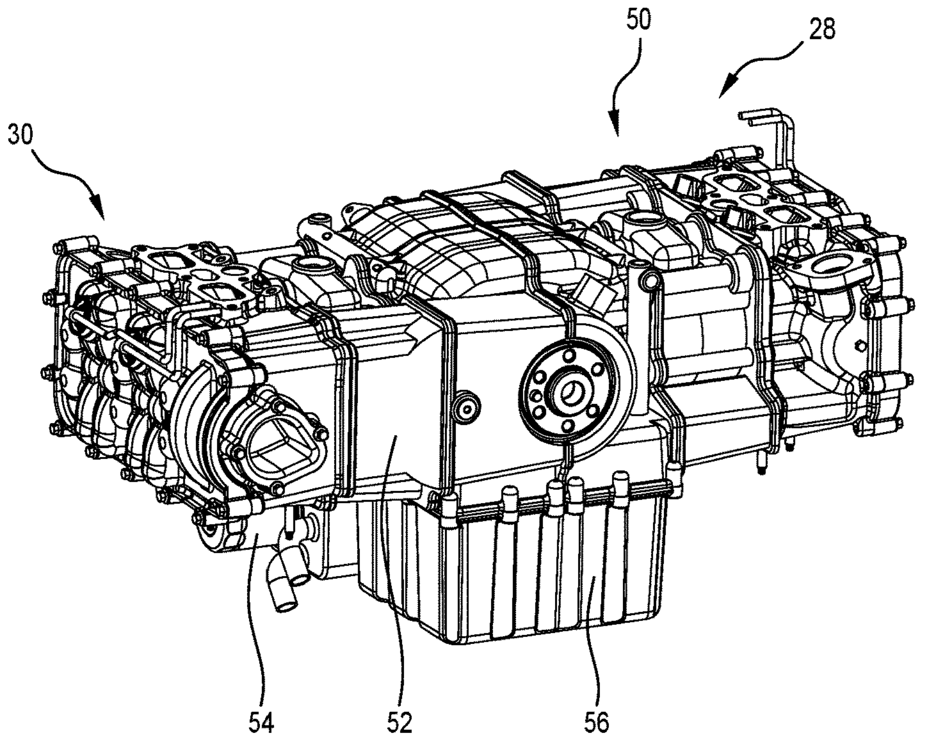
Figure 7:
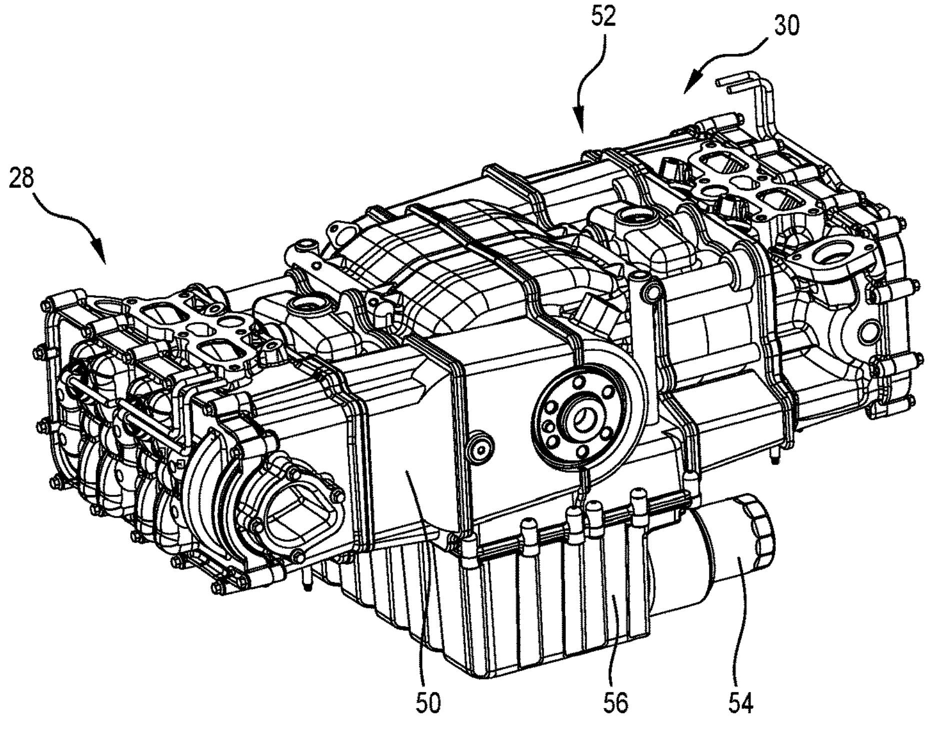

As can be seen in FIGS. 1 and 2 of the drawings, in many traditional engines, the engine 10 is made up of major components to the left or right side of the engine 10. In particular, FIG. 1 shows a front view of the engine 10 showing a timing belt for coupling camshafts of the engine 10 to a crankshaft of the engine 10, whereas FIG. 2 shows a rear view of the engine 10. The engine 10 has many parts that can only be used on one side of the engine 10 and are not interchangeable.

In the example shown, the engine 10 of FIGS. 1 and 2 of the drawings is in the form of a previously proposed opposed cylinder engine. In this engine 10 as depicted, the cylinder head 12 will be different on one cylinder bank 14 versus an opposite cylinder bank 16, and the engine 10 will be different on one cylinder bank 14 versus the opposite cylinder bank 16. This leads to inefficiencies as these parts are not only different in their machined form but also different in their original cast form, therefore requiring separate dies, tooling and fixtures/jigs in order to make, machine and use these parts. Moreover, the surrounding parts are also affected by the non-commonality. Specifically, items like gaskets, mounting faces and accessory parts must be specially designed and manufactured for each different cylinder bank.

With reference to FIGS. 3 to 11 of the drawings, there is shown an internal combustion engine 18 in accordance with an example of the present invention. Advantageously, the internal combustion engine 18 shown in FIGS. 3 to 11 has improved commonality of parts such that there can be less part tooling, common castings, less machining, and the ability to interchange parts in production and in the field. Other advantages are also discussed throughout this document. In particular, FIGS. 3 to 7 show various views of the engine 18, showing the proposed engine layout with virtually identical front and rear views (see FIG. 3 and FIG. 4A). Only the shape of the sump 56 and location of the filter 54 give an indication as to which end of the engine 18 is the front and which end of the engine 18 is the rear. FIG. 4B shows an additional rear view of the engine 18, similar to the view in FIG. 4A but from a slightly different perspective so as to show the filter 54.

The internal combustion engine 18 of the present invention includes a piston 20, a cylinder 22, and an output shaft 24, wherein the piston 20 is arranged for reciprocating motion within the cylinder 22, driven by combustion, and the piston 20 is coupled to the output shaft 24 by a coupling 26 such that said reciprocating motion of the piston 20 drives rotation of the output shaft 24. The engine 18 has increased engine part commonality.

The engine 18 includes a first cylinder bank 28 and a second cylinder bank 30. The first cylinder bank 28 has a first cylinder head 32, the second cylinder bank 30 has a second cylinder head 34, and the first cylinder head 32 and the second cylinder head 34 are formed as common parts such that they are interchangeable. More specifically, the first cylinder head 32 and the second cylinder head 34 are formed as duplicates of the same part—that is, the first cylinder head 32 is identical to the second cylinder head 34 and may, in one example, be formed in the same mould (or other manufacturing equipment) as the second cylinder head 34. In other words, the first cylinder head 32 and the second cylinder head 34 may be formed as common castings such that they are interchangeable parts.

In the example shown, the first cylinder bank 28 has a first cylinder block 36, the second cylinder bank 30 has a second cylinder block 38, the first cylinder block 36 and the second cylinder block 38 being formed as common parts such that they are interchangeable. The first cylinder block 36 is identical to the second cylinder block 38 and may, in one example, be formed in the same mould (or other manufacturing equipment) as the second cylinder block 38. The first cylinder block 36 and second cylinder block 38 may be formed as common castings such that they are interchangeable parts.

One end 40 of the engine 18 is provided with a first mounting part 42 for mounting other components and an opposite end 44 of the engine is provided with a second mounting part 46 for mounting other components. The first mounting part 42 and the second mounting part 46 are formed as common parts such that they are interchangeable. The first mounting part 42 and the second mounting part 46 are arranged with a mounting face 48 for coupling to a transmission, generator or other device.

In one example, the first mounting part 42 and the second mounting part 46 may be arranged to couple a transmission to one end of the engine 18 and an electric motor or generator to the opposite end of the engine 18.

The engine 18 includes the first cylinder bank 28 and the second cylinder bank 30, wherein a drive 50 for a camshaft of the first cylinder bank 28 from the crankshaft is at one end of the crankshaft, and wherein a drive 52 for a camshaft of the second cylinder bank 30 from the crankshaft is at an opposite end of the crankshaft. Advantageously, as the engine 18 is in the form of an opposed cylinder engine wherein the opposed pistons are directly opposed rather than being staggered (as in a traditional "boxer" engine) the engine 18 is shorter and is able to sacrifice having a bit of extra length so as to provide the drive 50, 52 for the camshafts at each end of the engine 18. By having the drive 50, 52 for the camshafts at each end of the engine 18, commonality of parts in the engine 18 is maximised and optimised.

Figure 8:
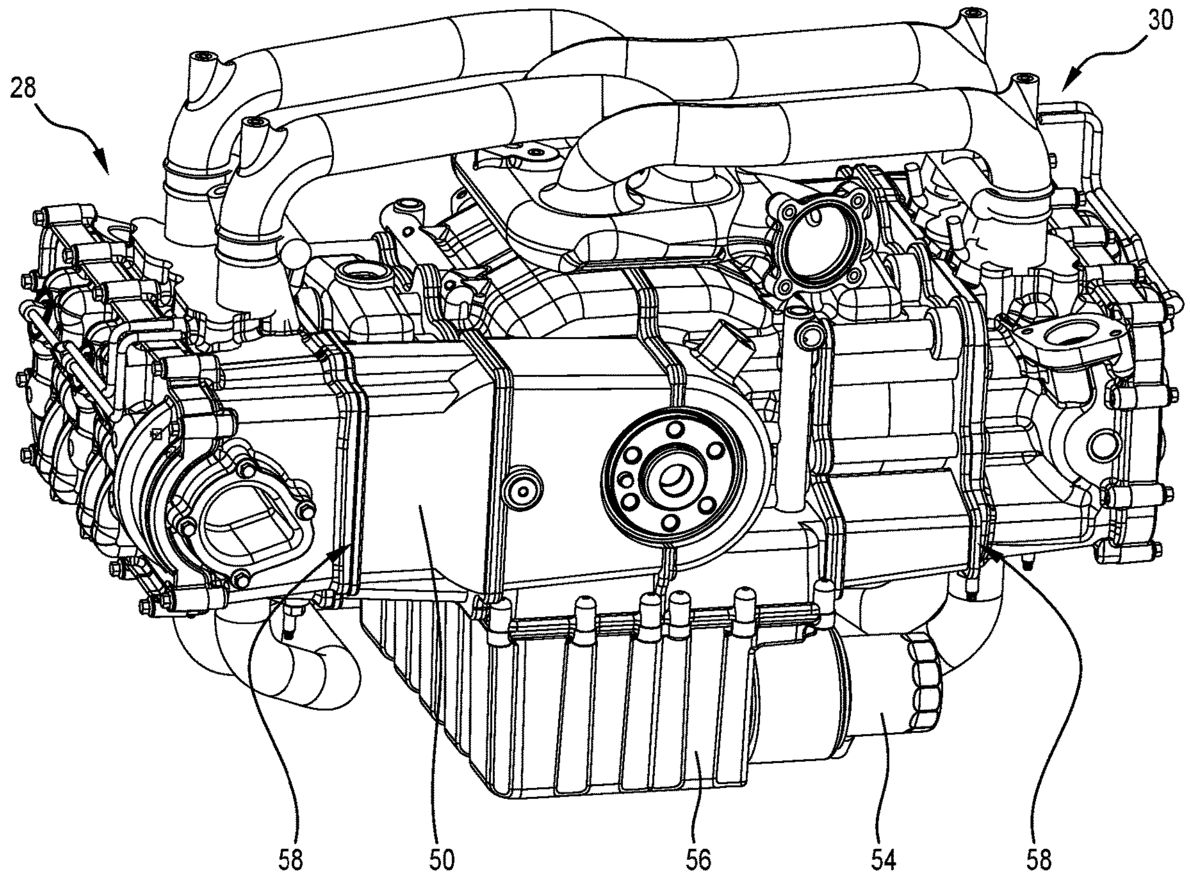
FIG. 8 shows a perspective view of the internal combustion engine of FIGS. 3 to 7, showing common heads and blocks.
Figure 9:
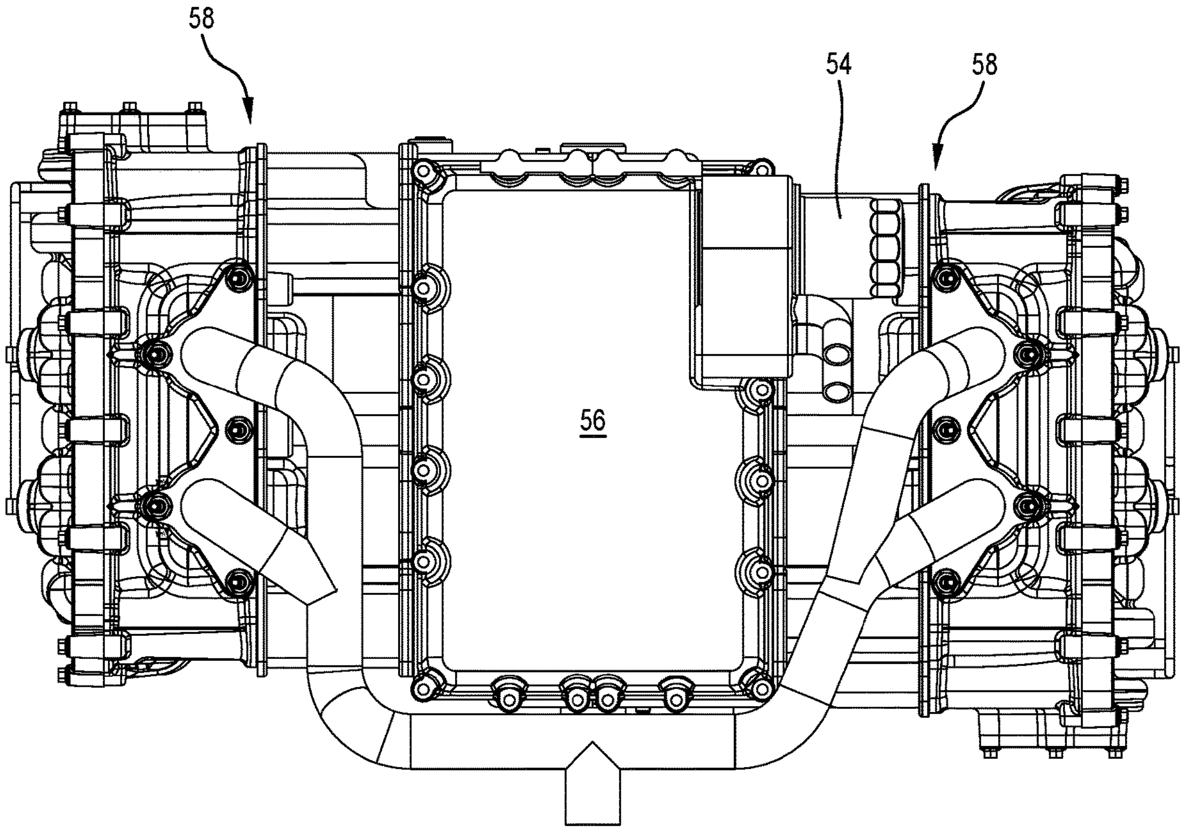
FIG. 9 shows a bottom view of the internal combustion engine of FIGS. 3 to 8.

With reference to FIG. 8 and FIG. 9 of the drawings, arrows 58 show the same head and block unit interfaces facing opposite directions. FIG. 9 shows the bottom of the engine 18 depicting common heads and blocks. Note that, in this example, there is an offset profile due to the internal camshaft and balance shaft drive. In alternative examples, there may be no offset.

The coupling 26 from the pistons 20 to the output shaft 24 is arranged such that the pistons 20 have sinusoidal motion for constant rotational velocity of the output shaft 24 when plotted against rotational angle of the output shaft 24. In one particular example, the engine 18 may be in the form of an opposed cylinder engine which may have particular advantages in relation to increasing the commonality of parts, and a particular working interrelationship with the increased commonality of parts, as mentioned above.

The engine 18 may have the same mounting points by way of the mounting faces 48 at the front and rear of the engine 18. It is particularly advantageous to use the present invention with an opposed cylinder engine, as the opposed cylinder engine is shorter owing to directly opposed (rather than staggered) pistons such that it is possible to sacrifice an additional amount of engine length, for example 30 mm or so, so as to allow the additional camshaft drive 50, 52 at both ends.

The present invention outlines a design for an engine 18 where the major parts of the engine 18 are common from the first cylinder bank 32 to the second cylinder bank 34 and from the front of the engine 18 to the back of the engine 18.

Figure 10:
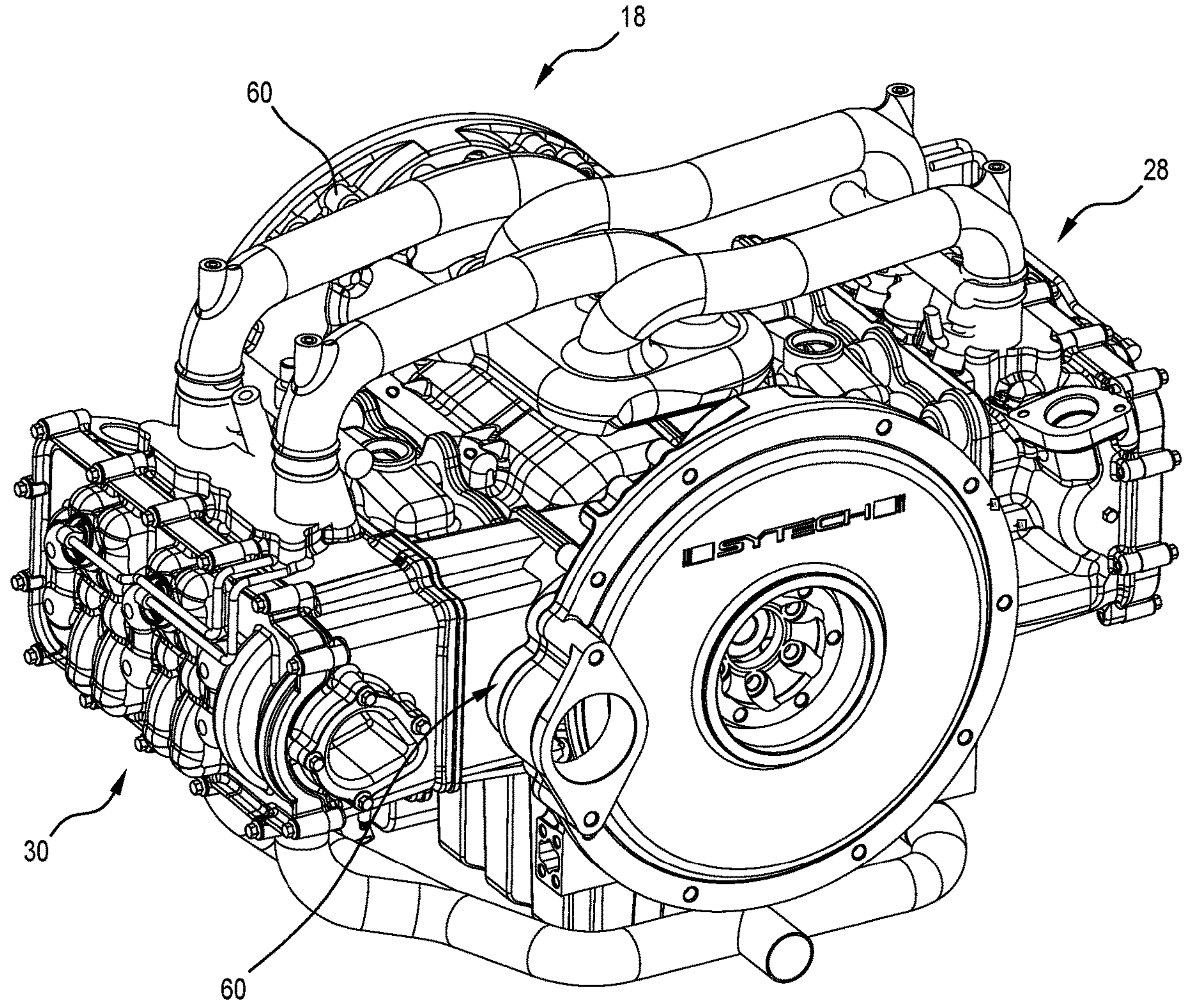
FIG. 10 shows a perspective view of the internal combustion engine of FIGS. 3 to 9, with a mounting plate fitted to each of the front end and rear end of the engine.
Figure 11:
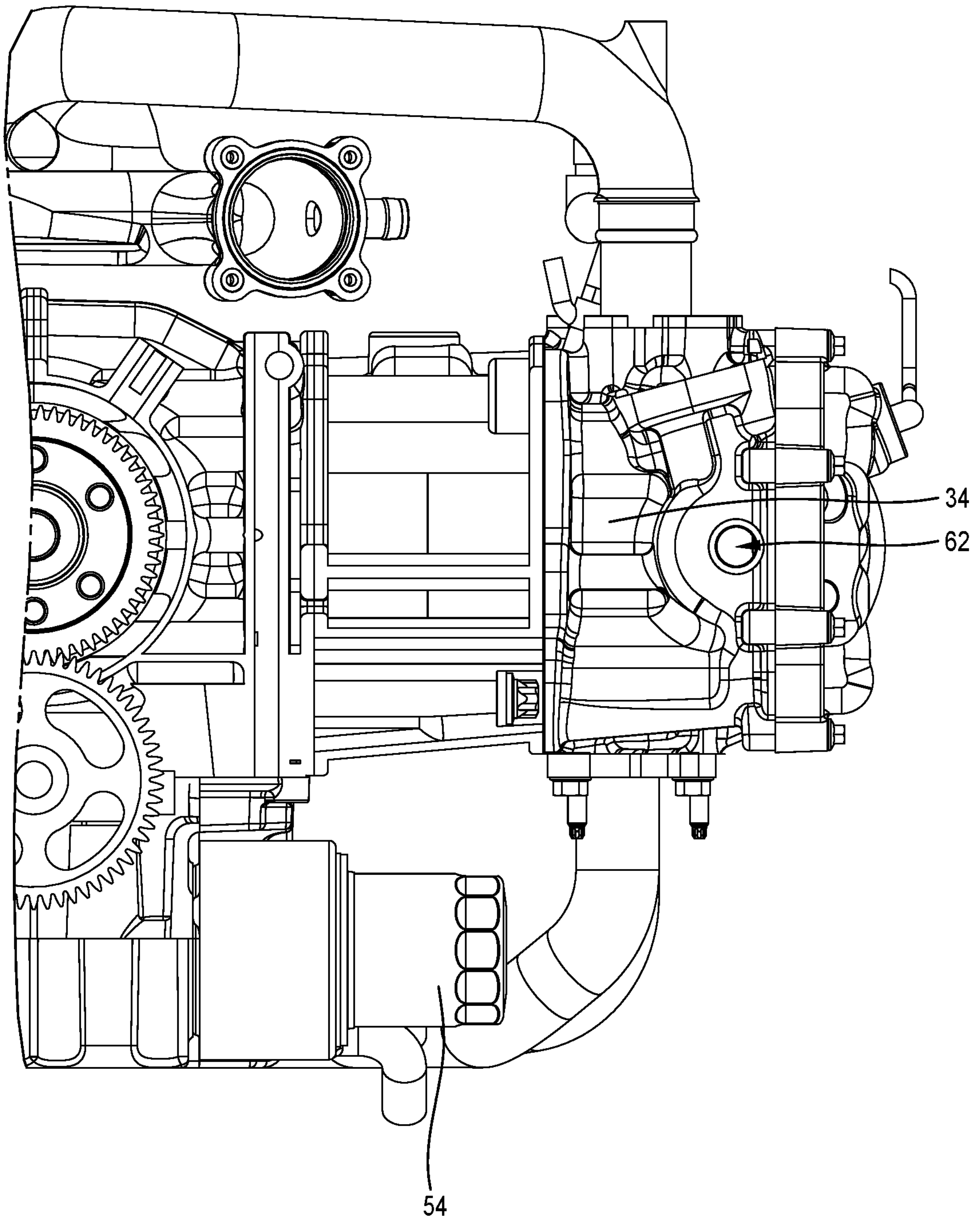
FIG. 11 shows a detailed review of a cylinder head of the internal combustion engine of FIGS. 3 to 10, showing a common head with timing gear access.
Figure 12A:
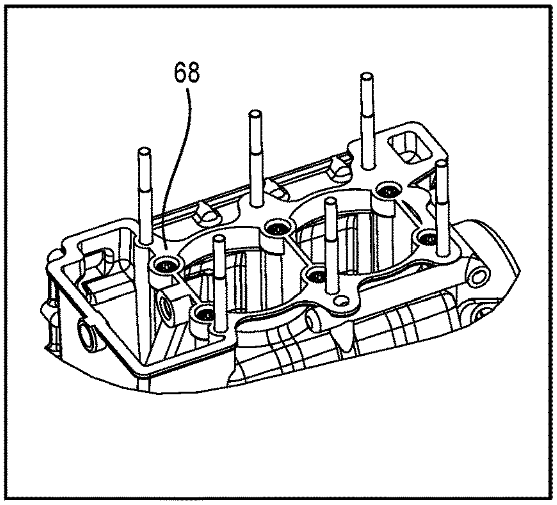
FIG. 12 shows various views (a to f) of crankcase halves of the engine and a cylinder block of the engine in accordance with another example of the invention.
Figure 12B:
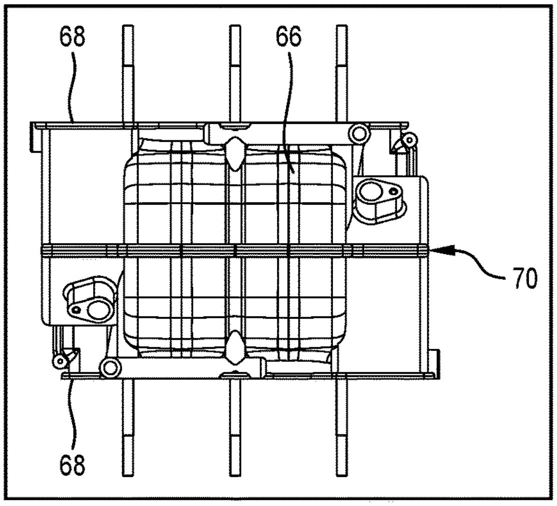
Figure 12C:
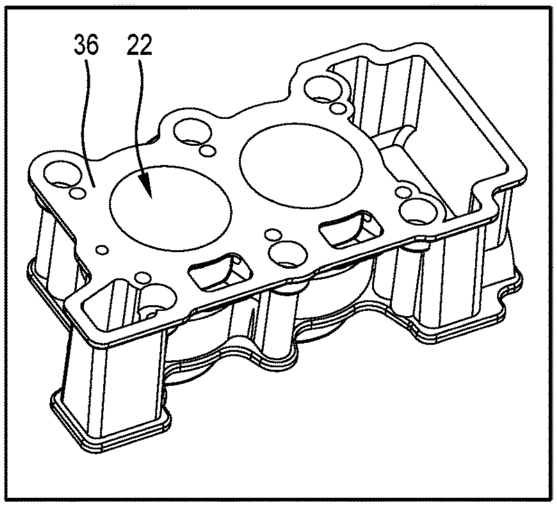
Figure 12D:
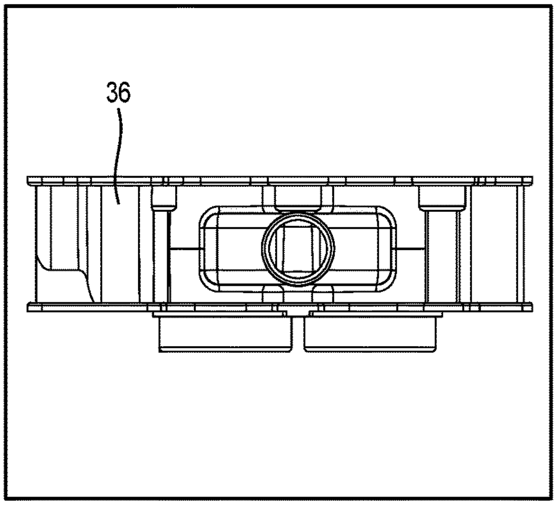
Figure 12E:
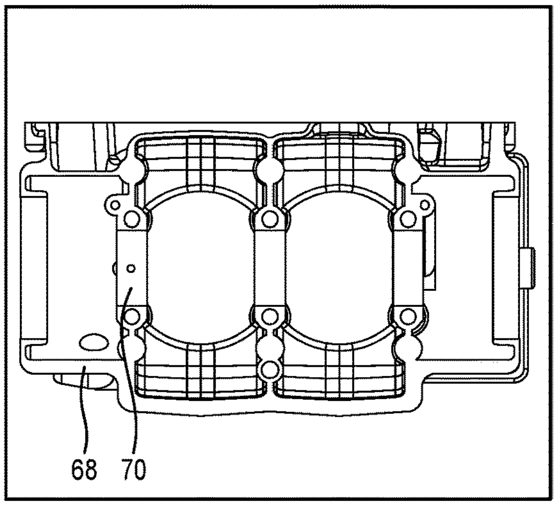
Figure 12F:
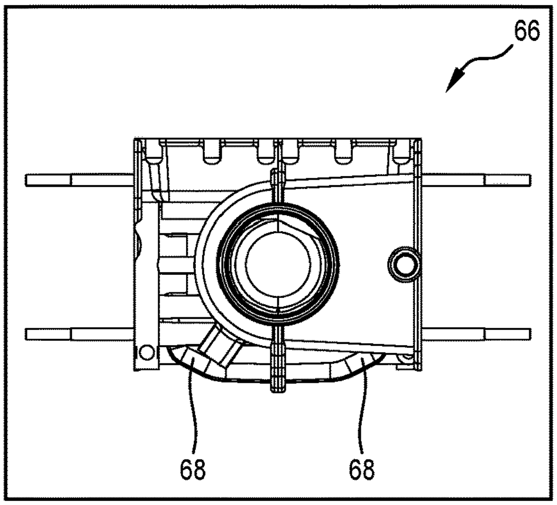
Figure 13:
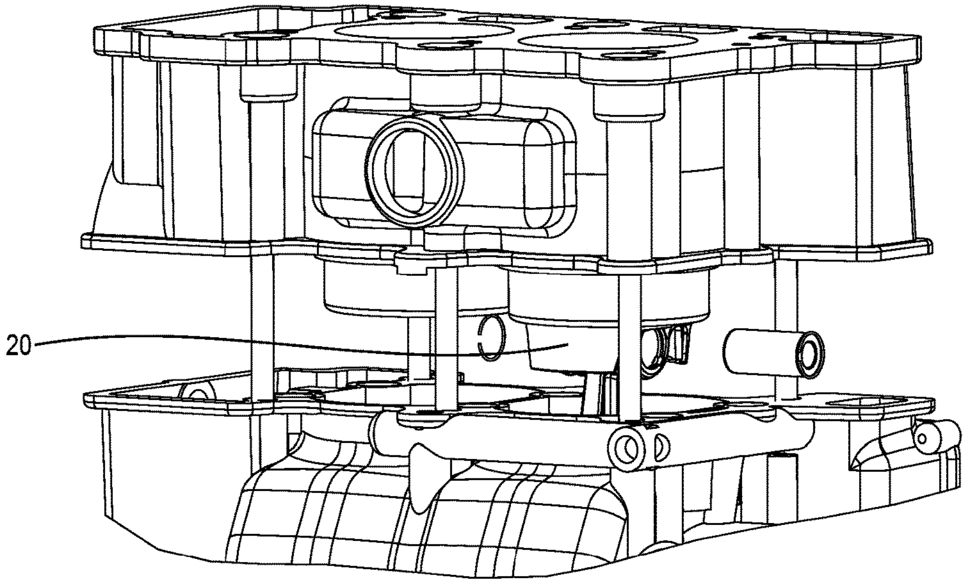
FIG. 13 shows a partially disassembled perspective view of the engine, depicting fitment of a piston within a cylinder.

Turning to FIG. 10, arrows 60 show identical flywheel mounting faces at the front and rear of the engine 18. FIG. 11 shows a common head with timing gear access 62.

With reference to FIGS. 12 to 21 (FIG. 12 includes views a to f), a further example of the invention is shown in which the engine cylinder block is split into two parts, a cylinder block and a crankcase. The applicant has carried the commonality concept forward in such a way that the engine depicted in these drawings comprises the following:

- two crankcase halves that are common;
- two cylinder blocks which are common; and
- two cylinder heads which are common.

The crankcase halves are cast from the same parts, almost fully machined and then the two halves are bolted together and the crankshaft bore is final machined. The machining is the only operation that needs to be conducted with the two halves together; this ensures the two are parts matched and, advantageously, is a simple machining operation, relatively low cost.

More specifically, the example shown in FIGS. 12 to 21 includes an internal combustion engine 18, including a piston 20, a cylinder 22, and an output shaft 24, wherein the piston 20 is arranged for reciprocating motion within the cylinder 22, driven by combustion, and the piston 20 is coupled to the output shaft 24 by a coupling 26 such that said reciprocating motion of the piston 20 drives rotation of the output shaft 24, wherein the engine 18 includes an engine cylinder block 64 formed as separable parts, being a crankcase 66 and at least one cylinder block 36.

In another aspect, the crankcase 66 is formed of a plurality of separable like parts 68, each of the like parts 68 being cast as a common part. In particular, each of the like parts 68 is an identical part and may be cast from a common mould. In the example shown, the crankcase 66 is formed of a pair of said separable like parts 68, such that each of said separable like parts 68 is a half of the crankcase 66. The engine 18 also includes a pair of cylinder blocks 36, 38, each of the cylinder blocks 36, 38 being formed as a common part.

Figure 14:
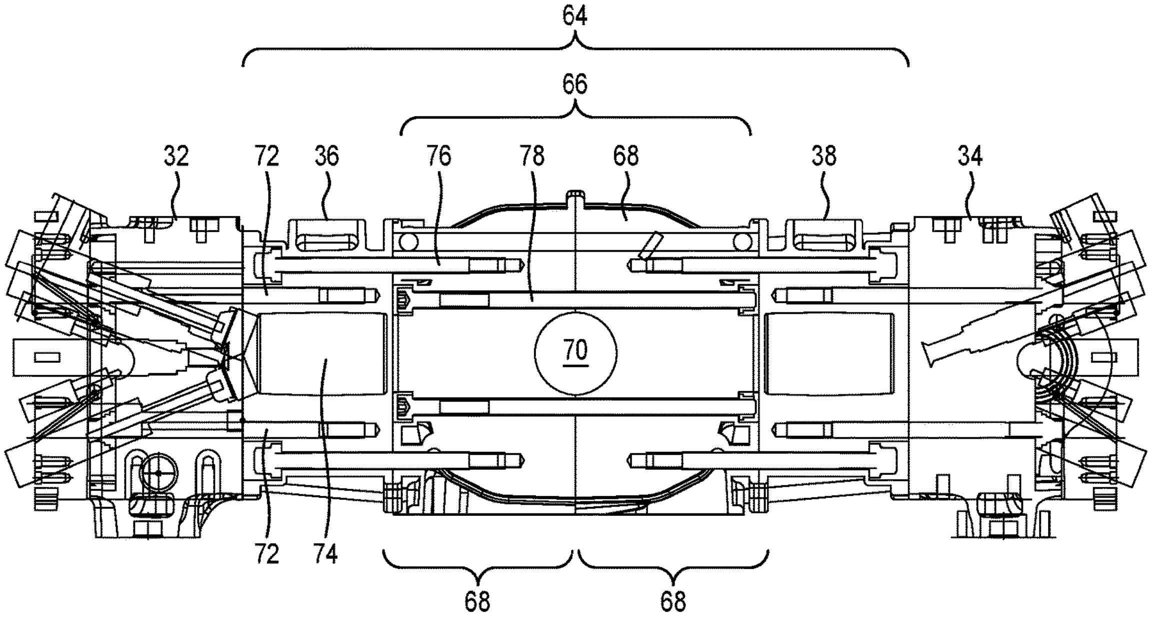
FIG. 14 shows a cutaway view of a proposed bolt concept for an example of the engine.

As depicted, the engine 18 further includes a pair of cylinder heads 32, 34, each of the cylinder heads 32, 34 being formed as a common part. FIG. 14 shows CH bolts 72 for bolting the cylinder heads 32, 34 to the cylinder blocks 36, 38. The cylinder block 36 may be formed of aluminium 74, held to the crankcase 66 by way of bolts 76 which, by way of non-limiting example, may be M10 studs with 125 mm length. Main bearing bolts 78 may be M10 inner hexagon bolts. The crankcase halves 68 (left and right) may be formed from cast iron.

Figure 15:
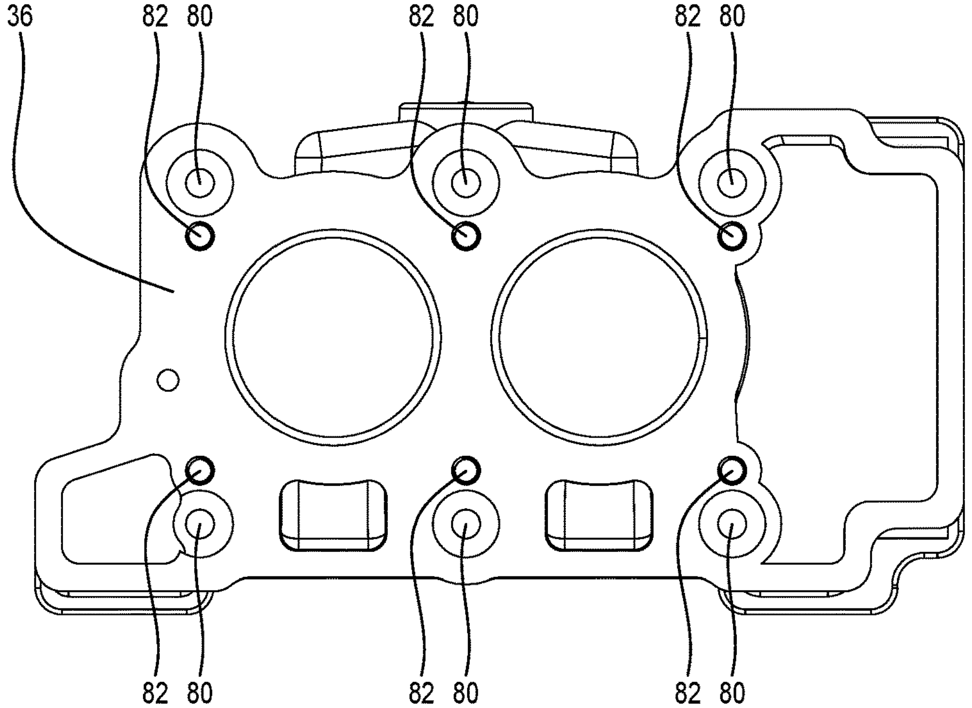
FIG. 15 shows a top view of a cylinder block.
Figure 16:
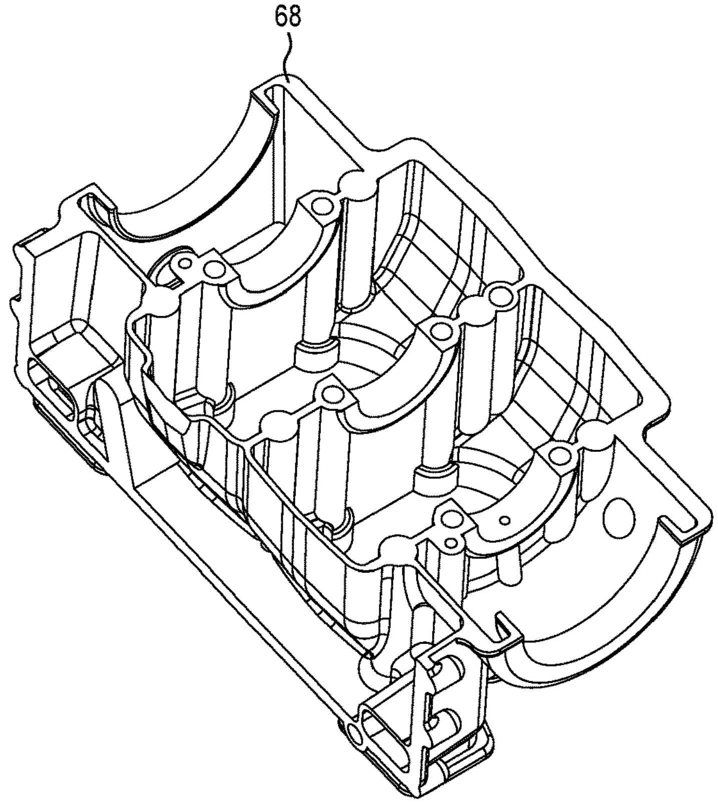
FIG. 16 shows a perspective view of a crankcase half of the engine in accordance with the example shown in FIG. 14.
Figure 17:
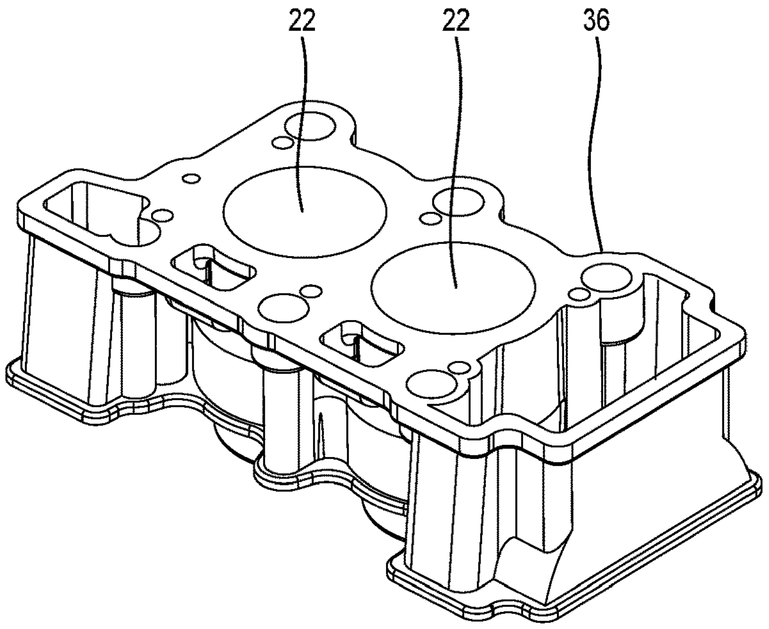
FIG. 17 shows a perspective view of an aluminium cylinder block with water jacket of the example shown in FIG. 14.

FIG. 15 shows the cylinder block 36 having two cylinders and with example dimensions. The bolts 80 relate to a liner and the bolts 82 relate to the head. FIG. 16 shows a perspective view of the crankcase half 68 separated from the other like crankcase half 68. FIG. 17 shows the aluminium cylinder block 36 (or 38) with a water jacket and two cylinders.

Figure 18:
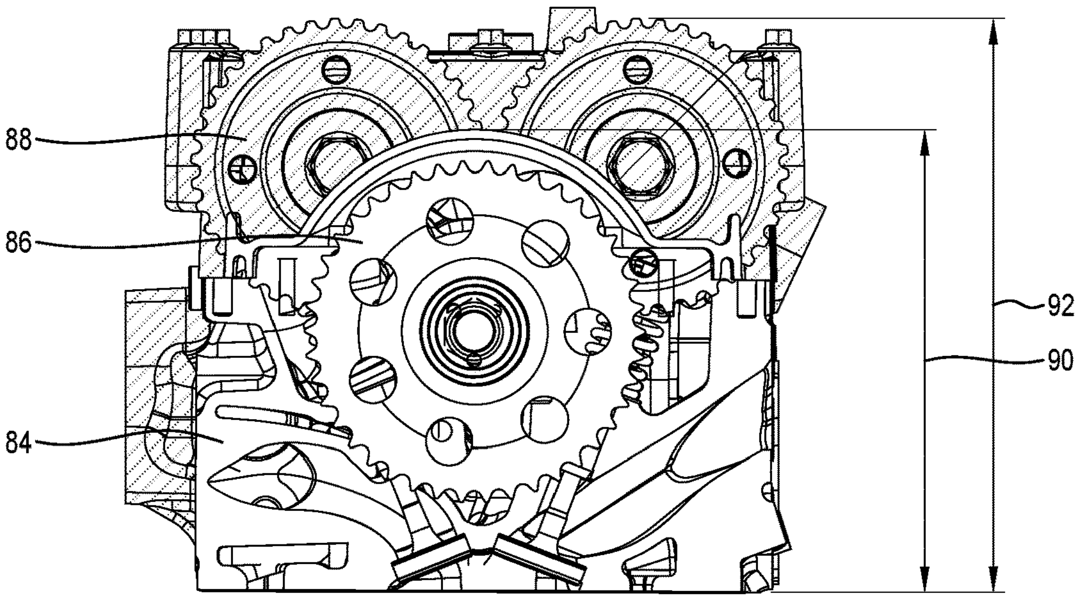
FIG. 18 shows a cam arrangement of a single overhead camshaft with low head height in comparison with an existing double overhead camshaft arrangement for reference.

With reference to FIG. 18, there is shown a cam arrangement, being a single overhead cam (SOHC) arrangement 84 with a low head height. The arrangement has a pulley 86 in the SOHC layout with a lowered camshaft position. The arrangement is transposed above a double overhead cam (DOHC) arrangement 88 in order to demonstrate the compact nature and comparably low height of the SOHC arrangement 84. Height dimension 90 for the SOHC arrangement 84 is 145 mm in the example shown, whereas the height dimension 92 for the DOHC arrangement 88 is 183 mm (the double overhead cam DOHC arrangement 92 being shown merely for reference in size). The SOHC arrangement 84 noticeably also provides advantages including being a narrow engine, having common heads, common cylinder blocks and balance shafts which are gear-driven (one front and one rear).

Figure 19:
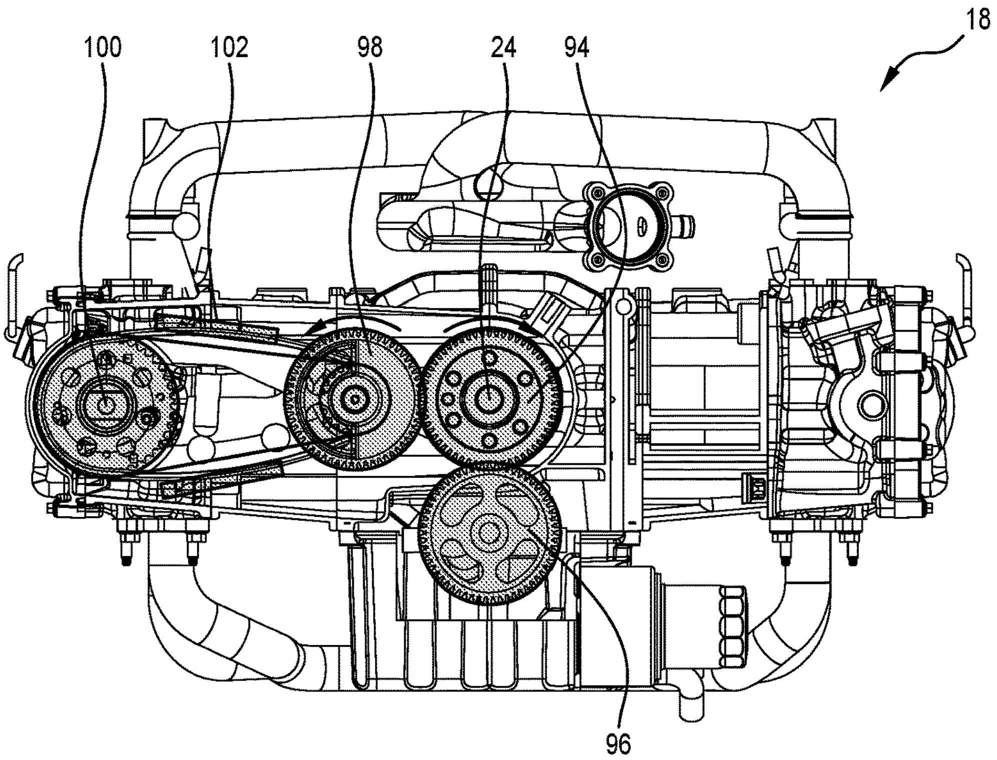
FIG. 19 shows a front view of a preferred drive arrangement layout overview with a single camshaft per cylinder bank design.
Figure 20:
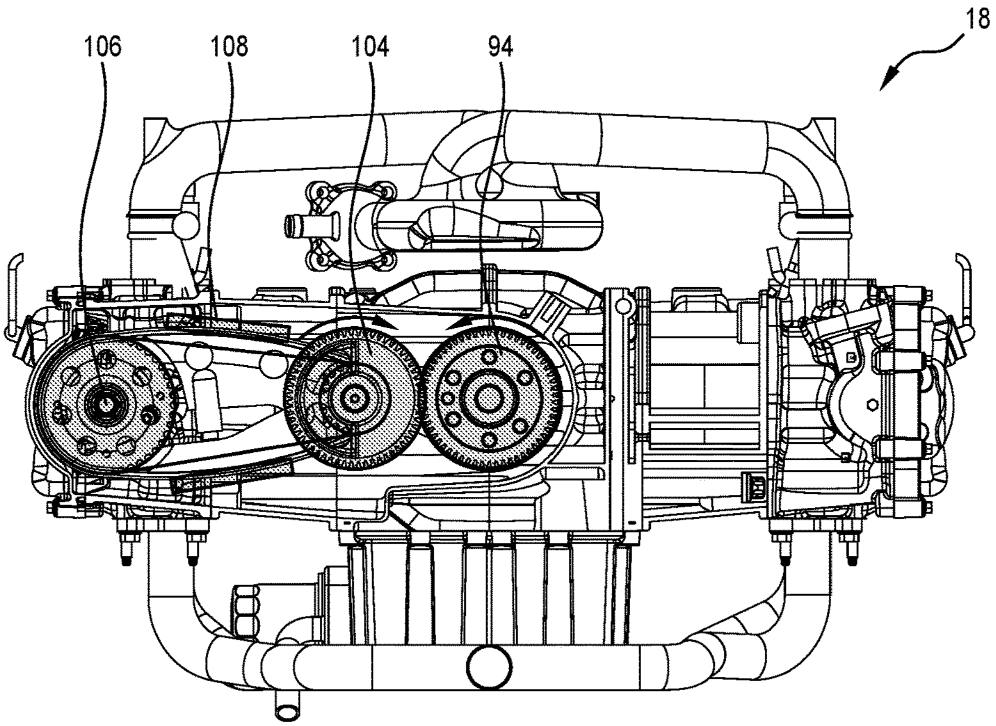
FIG. 20 shows a rear view of the drive arrangement shown in FIG. 19.
Figure 21:
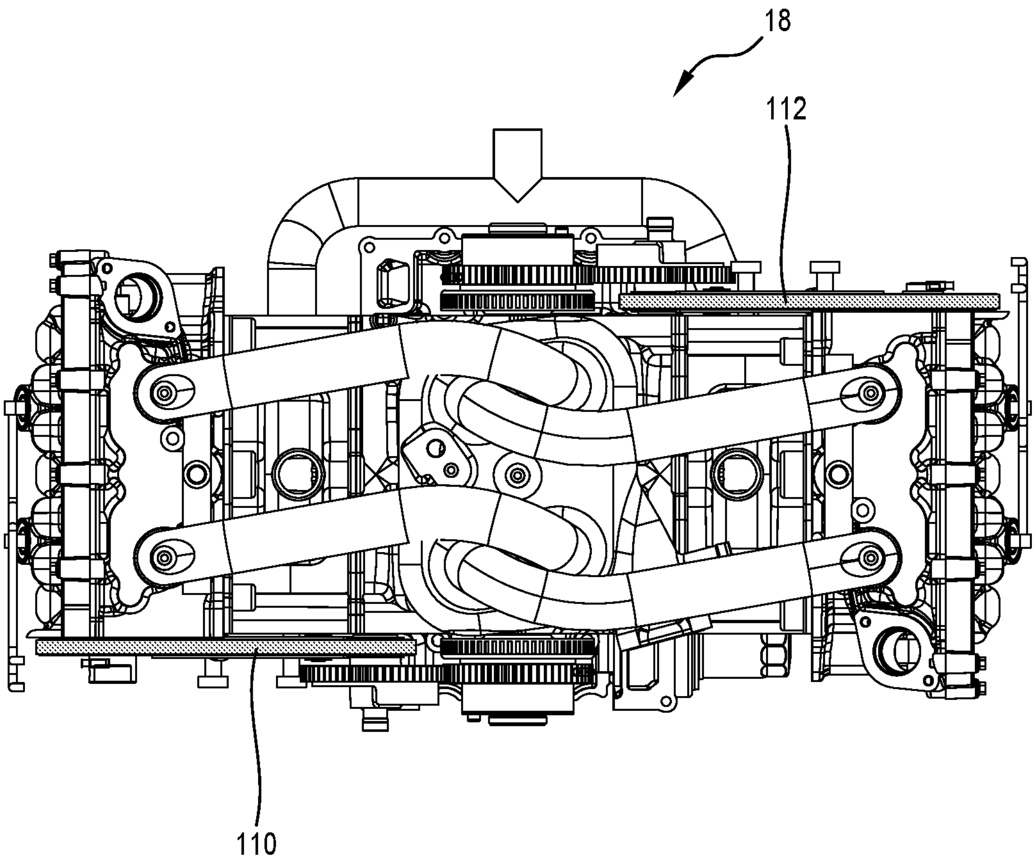
FIG. 21 shows a top view of the drive arrangement shown in FIGS. 19 and 20.

FIGS. 19 to 21 show a preferred timing drive arrangement with a chain driven system. In particular, FIG. 19 shows a front view of the preferred drive arrangement, FIG. 20 shows a rear view of the preferred drive arrangement and FIG. 21 shows a top view of the preferred drive arrangement. The arrangement has a single overhead camshaft per bank. With particular reference to FIG. 19, it is shown diagrammatically that the gear crankshaft 94 drives an oil pump 96, also with a geared arrangement to drive a sprocket mass balance gear 98 which, in turn, drives the single overhead camshaft 100 by way of a chain, the chain being tensioned by a tensioner 102.

Turning to FIG. 20, there is shown a rear view of the preferred drive arrangement shown in FIG. 19, depicting a drive arrangement for a single overhead camshaft of the opposite cylinder bank. More specifically, the gear crankshaft 94 is in geared arrangement at the other end of the engine 18 to drive another sprocket mass balance gear 104 which, in turn, drives a single overhead camshaft 106 of the opposite cylinder bank by way of a chain, the chain being tensioned by a tensioner 108. Accordingly, with this arrangement, the mass balance shafts are driven by gear engagement with the gear crankshaft 94 at either end of the engine 18. In one example, a silent chain is used for the timing drive, with the sprocket mass balance gear having 19 teeth, and the oil pump 96 being driven by a bush chain. Alternatively, the oil pump 96 may be gear driven directly from the gear crankshaft 94.

FIG. 21 shows a top view of the preferred drive arrangement of FIGS. 19 and 20. This view shows the front drive 110 for driving the single overhead camshaft of one bank of cylinders, and the rear drive 112 for driving the single overhead camshaft of the opposite bank of cylinders. In one example, an oil pump drive may be provided at the front of the engine 18.

The applicant uses a method for forming the engine 18, including the steps of casting the crankcase halves 68 as similar parts; and coupling together the crankcase halves 68 to form the crankcase 66. The step of coupling together the crankcase halves 68 may be performed by bolting together the crankcase halves 68.

The method may further include a step of final machining a crankshaft bore 70 in the crankcase 66 subsequent to the step of coupling together the crankcase halves 68.

This block arrangement as described above may provide the following advantages:

- part commonality
- freedom of material choice
- ability to change engine size by changing bores only
- ease of assembly
- ability to change to different liner types in future
  - spray in liner
  - piston in base bore material
  - press in liner
  - etc
- service/repair cost
- more common parts with turbo engine The following features in a preferred example of the invention may be particularly advantageous:

- the use of common cylinder head casting for the left and right bank
- the use of a common block-half casting for the left and right bank
- the use of a common mounting faces at the front and rear of the engine
- the ability to mount a transmission, generator or other device to either the front or rear of the engine
- the ability to mount both a transmission to one end of the engine and electric motor/generator to the other end of the engine
- the use of common cam drives
- the use of common balance shafts and drive These features may result in the following advantages in a preferred example of the invention:

- less part tooling
- common castings (the casting metal mould for cylinder block and cylinder head can be reduced by 50%)
- less machining
- the ability to interchange parts in production and in the field
- less stock control and variation
- higher volumes of common parts leading to lower cost
- more engine flexibility in applications and installations
- a cleaner engine with fewer external components
- multiple engine installation and mounting points
- lower logistics area required for big parts
- simpler production organisation The advantages in examples of the invention may facilitate a lower cost engine in production, lower stock requirements, lower part costs and lower maintenance costs in the greater part commonality.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

LIST OF FEATURES

10 Previously proposed engine
12 Cylinder head

14 One cylinder bank
16 Opposite cylinder bank
18 Engine in accordance with an example of the present invention
20 Piston
22 Cylinder
24 Output shaft
26 Coupling
28 First cylinder bank
30 Second cylinder bank
32 First cylinder head
34 Second cylinder head
36 First cylinder block
38 Second cylinder block
40 One end of the engine
42 First mounting part
44 Opposite end of the engine
46 Second mounting part
48 Mounting face
50 Drive for a camshaft of the first cylinder bank
52 Drive for a camshaft of the second cylinder bank
54 Filter
56 Sump
58 Arrows
60 Arrows showing identical flywheel mounting faces
62 Timing gear access
64 Engine cylinder block
66 Crankcase
68 Crankcase halves
70 Crankshaft bore
72 CH bolts
74 Aluminium cylinder block
76 Bolts
78 Main bearing bolts
80 Red bolts
82 Black bolts
84 Single Overhead Cam (SOHC) arrangement
86 Pulley
88 Double Overhead Cam (SOHC) arrangement
90 Height dimension for Single Overhead Cam (SOHC) arrangement
92 Height dimension for Double Overhead Cam (DOHC) arrangement
94 Gear crankshaft
96 Oil pump
98 Sprocket mass balance gear
100 Single overhead camshaft
102 Tensioner
104 Sprocket mass balance gear at opposite end of engine
106 Single overhead camshaft of opposite cylinder bank
108 Tensioner at opposite end of engine
110 Front drive
112 Rear drive

The invention claimed is:

1. An internal combustion engine having a horizontally opposed cylinder arrangement, including at least one pair of pistons associated with a respective pair of directly opposed cylinders of a first and second cylinder bank of the cylinder arrangement, and an output shaft,
  wherein each of the pistons is arranged for reciprocating motion within a respective one of the cylinders, driven by combustion,
  wherein the pistons are coupled to the output shaft by a coupling such that said reciprocating motion of the piston drives rotation of the output shaft,
  wherein the engine has engine part commonality from both the first cylinder bank to the second cylinder bank and from a front end of the engine to a rear end of the engine, with a cylinder head and a cylinder block of the first cylinder bank being respectively interchangeable with a cylinder head and a cylinder block of the second cylinder bank, and with first and second mounting plates fitted at the front and rear ends of the engine being interchangeable with one another allowing a transmission, electric motor, or generator to be mounted to either end of the engine by said mounting plates, and
  wherein the first and second cylinder banks each include a separate camshaft and drives for each camshaft are provided at opposite ends of the engine.

2. An internal combustion engine as claimed in claim 1, wherein the cylinder head of the first cylinder bank and the cylinder head of the second cylinder bank are formed as common castings such that they are interchangeable parts.

3. An internal combustion engine as claimed in claim 1, wherein the cylinder block of the first cylinder bank and cylinder block of the second cylinder bank are formed as common castings such that they are interchangeable parts.

4. An internal combustion engine as claimed in claim 1, wherein the first mounting plate and the second mounting plate are formed as common parts such that they are interchangeable.

5. An internal combustion engine as claimed in claim 4, wherein the first mounting plate and the second mounting plate are arranged to couple a transmission to one end of the engine and an electric motor or generator to the opposite end of the engine.

6. An internal combustion engine as claimed in claim 1, wherein drive for a camshaft of the first cylinder bank from a crankshaft of the engine is at one end of the crankshaft, and wherein drive for a camshaft of the second cylinder bank from the crankshaft is at an opposite end of the crankshaft.

7. An engine as claimed in claim 1, wherein the coupling is arranged such that the piston has sinusoidal motion for constant rotational velocity of the output shaft when plotted against rotational angle of the output shaft.

8. An internal combustion engine as claimed in claim 1, wherein drive for a camshaft of the first cylinder bank from the output shaft is at one end of the output shaft, and wherein drive for a camshaft of the second cylinder bank from the output shaft is at an opposite end of the output shaft.

9. An internal combustion engine as claimed in claim 1, wherein the engine includes a crankcase formed of a plurality of separable like parts, each of the like parts being cast as a common part.

10. An engine as claimed in claim 9, wherein each of the like parts is an identical part.

11. An engine as claimed in claim 10, wherein each of the like parts is cast from a common mold.

12. An engine as claimed in claim 9, wherein the crankcase is formed of a pair of said separable like parts, such that each of said separable like parts is a half of the crankcase.

13. A method of forming an engine as claimed in claim 12, the method including the step of casting the crankcase halves as similar parts; and coupling together the crankcase halves to form the crankcase.

14. A method of forming an engine as claimed in claim 13, wherein the step of coupling together the crankcase halves is performed by bolting together said crankcase halves.

15. A method of forming an engine as claimed in claim 13, further including the step of final machining a crankshaft bore in the crankcase subsequent to the step of coupling together the crankcase halves.

16. An internal combustion engine having a horizontally opposed cylinder arrangement, the engine including:

a first cylinder bank having a cylinder head, a cylinder block and a camshaft; and a second cylinder bank having a cylinder head, a cylinder block and a camshaft;

wherein a drive for the camshaft of the first cylinder bank is provided at an opposite end of the engine to a drive for a camshaft of the second cylinder bank, allowing for the cylinder heads and cylinder blocks of the first and second cylinder banks to be respectively interchangeable, wherein the engine further includes:

a first mounting plate provided at a first end of the engine and configured to couple a transmission to the first end of the engine, and a second mounting plate provided at a second end of the engine and configured to couple a generator or electric motor to the second end of the engine, and wherein the first and second mounting plates are interchangeable so as to provide an ability to mount a transmission, electric motor or generator to either end of the engine.

17. An internal combustion engine having a horizontally opposed cylinder arrangement, the engine including:

a first cylinder bank having a first cylinder head casting, a first cylinder block casting, and a camshaft;

a second cylinder bank having a second cylinder head casting, a second cylinder block casting, and a camshaft;

a first mounting plate fitted at a first end of the engine and to couple with a transmission, and a second mounting plate fitted at a second end of the engine and configured to couple with a generator or electric motor to;

wherein the engine has engine part commonality from both the first cylinder bank to the second cylinder bank and from a front end of the engine to a rear end of the engine in that: (i) the first and second cylinder head castings are common castings, (ii) the first and second cylinder block castings are common castings, (iii) the first and second mounting plates are common parts, such that they are respectively interchangeable, and (iv) drives of the respective camshafts of the cylinder banks are provided at opposite ends of the engine.

18. An internal combustion engine as claimed in claim 17, including a crankshaft and pistons mounted for reciprocating motion in the first and second cylinder block castings, the pistons being coupled to cause rotation of the crankshaft, the crankshaft being supported in a crankshaft bore which is finally machined after the first and second cylinder block castings are coupled together.

* * * * *